(12) United States Patent
Kanehira et al.

(10) Patent No.: US 9,908,439 B2
(45) Date of Patent: Mar. 6, 2018

(54) SEAT SLIDE DEVICE (71) Applicants: AISIN SEIKI KABUSHIKI KAISHA, Kariya-shi (JP); TOYOTA BOSHOKU KABUSHIKI KAISHA, Kariya-shi (JP); SHIROKI CORPORATION, Fujisawa-shi (JP)

(72) Inventors: Masayuki Kanehira, Gifu (JP); Wataru Sakaguchi, Nagoya (JP); Haruo Kato, Anjo (JP)

(73) Assignees: AISIN SEIKI KABUSHIKI KAISHA, Kariya-shi (JP); TOYOTA BOSHOKU KABUSHIKI KAISHA, Kariya-shi (JP); SHIROKI CORPORATION, Fujisawa-shi (JP)

( * ) Notice: Subject to any disclaimer, the term of this patent is extended or adjusted under 35 U.S.C. 154(b) by 0 days.

(21) Appl. No.: 15/216,222

(22) Filed: Jul. 21, 2016

(65) Prior Publication Data
US 2017/0021741 A1    Jan. 26, 2017

(30) Foreign Application Priority Data

Jul. 24, 2015   (JP) .................. 2015-146885

(51) Int. Cl.
*F16M 13/00*  (2006.01)
*B60N 2/02*   (2006.01)
*B60N 2/06*   (2006.01)

(52) U.S. Cl.
CPC .......... *B60N 2/0232* (2013.01); *B60N 2/067* (2013.01); *B60N 2002/0236* (2013.01)

(58) Field of Classification Search
CPC .............. B60N 2/0715; B60N 2/072

USPC .......... 248/424, 429, 430; 297/344.1, 344.11
See application file for complete search history.

(56) References Cited

U.S. PATENT DOCUMENTS

| | | | | |
|---|---|---|---|---|
| 4,667,530 A * | 5/1987 | Mettler | ................... | B62D 1/185 403/225 |
| 5,487,520 A * | 1/1996 | Mouri | ................... | B60N 2/067 248/429 |
| 5,941,494 A * | 8/1999 | Garrido | ................ | B60N 2/0715 248/429 |
| 6,309,019 B1 * | 10/2001 | Downey | .............. | B60N 2/0224 248/421 |
| 7,472,879 B2 * | 1/2009 | Weber | ................... | B60N 2/0232 248/429 |
| 7,717,795 B2 * | 5/2010 | Mellor | ....................... | F16C 1/08 464/181 |
| 8,382,596 B2 * | 2/2013 | Yuen | ......................... | F16C 1/08 403/383 |

(Continued)

FOREIGN PATENT DOCUMENTS

JP       2008-265735       11/2008

*Primary Examiner* — Terrell L McKinnon
*Assistant Examiner* — Michael McDuffie
(74) *Attorney, Agent, or Firm* — Oblon, McClelland, Maier & Neustadt, L.L.P.

(57) ABSTRACT

A seat slide device includes: a pair of seat slide rails configured to support a seat, each of the seat slide rails including a lower rail and an upper rail; a transfer shaft rotationally driven by motor drive in a state where the transfer shaft is provided in a bridging manner between the seat slide rails, the transfer shaft having a hollow portion; and rail drive mechanisms, each of the rail drive mechanisms being provided between the lower rail and the upper rail and being configured to move the upper rail relative to the lower rail based on a driving force transmitted from a motor via the transfer shaft.

6 Claims, 5 Drawing Sheets

(56) References Cited

U.S. PATENT DOCUMENTS

| | | | | | |
|---|---|---|---|---|---|
| 8,425,334 B2 * | 4/2013 | Yuen | | F16C 1/08 | |
| | | | | 156/184 | |
| 8,485,489 B2 * | 7/2013 | Hofschulte | | B60N 2/067 | |
| | | | | 248/424 | |
| 2009/0243327 A1 * | 10/2009 | Koga | | B60N 2/067 | |
| | | | | 296/65.15 | |
| 2010/0044542 A1 * | 2/2010 | Koga | | B60N 2/067 | |
| | | | | 248/429 | |
| 2010/0051776 A1 * | 3/2010 | Koga | | B60N 2/0232 | |
| | | | | 248/429 | |
| 2010/0065708 A1 * | 3/2010 | Koga | | B60N 2/067 | |
| | | | | 248/429 | |
| 2010/0264288 A1 * | 10/2010 | Thuleau | | B60N 2/0232 | |
| | | | | 248/429 | |
| 2011/0278419 A1 * | 11/2011 | Sovis | | B60N 2/0232 | |
| | | | | 248/429 | |
| 2012/0145868 A1 * | 6/2012 | Okada | | B60N 2/0228 | |
| | | | | 248/429 | |
| 2013/0153735 A1 * | 6/2013 | Ruthman | | B60N 2/0705 | |
| | | | | 248/429 | |
| 2013/0278033 A1 * | 10/2013 | Tame | | B60N 2/0818 | |
| | | | | 297/344.1 | |
| 2013/0334390 A1 * | 12/2013 | Schebaum | | B60N 2/0705 | |
| | | | | 248/429 | |
| 2014/0239689 A1 * | 8/2014 | Schebaum | | B60N 2/0843 | |
| | | | | 297/341 | |
| 2014/0374563 A1 * | 12/2014 | Tuji | | B60N 2/067 | |
| | | | | 248/429 | |
| 2015/0090856 A1 * | 4/2015 | Morishita | | B60N 2/0232 | |
| | | | | 248/429 | |
| 2015/0151650 A1 * | 6/2015 | Kim | | B60N 2/0705 | |
| | | | | 248/429 | |
| 2015/0191106 A1 * | 7/2015 | Inoue | | B60N 2/0715 | |
| | | | | 248/429 | |

* cited by examiner

SEAT SLIDE DEVICE

INCORPORATION BY REFERENCE

The disclosure of Japanese Patent Application No. 2015-146885 filed on Jul. 24, 2015 including the specification, drawings and abstract is incorporated herein by reference in its entirety.

BACKGROUND OF THE INVENTION

1. Field of the Invention

The present invention relates to a vehicle seat slide device.

2. Description of Related Art

There is such a vehicle seat slide device in which a rail drive mechanism is provided between a lower rail and an upper rail constituting a seat slide rail. The rail drive mechanism is configured to move the upper rail relative to the lower rail based on a driving force of a motor.

For example, a seat slide device described in Japanese Patent Application Publication No. 2008-265735 (JP 2008-265735 A) includes a transfer shaft rotationally driven by motor drive in a state where the transfer shaft is provided in a bridging manner between a pair of right and left seat slide rails. Further, in the seat slide device, a rail drive mechanism provided in each of the seat slide rails includes a screw shaft extending in an extension direction of the each of the seat slide rails, a nut member threadedly engaged with the screw shaft, and a rotation transmission mechanism that rotates the screw shaft and the nut member relative to each other based on a driving force transmitted from a motor via the transfer shaft. More specifically, in this conventional example, the nut member and the screw shaft are rotationally driven in a state where the nut member is fixed to one of the lower rail and the upper rail, and the screw shaft is supported by the other one of the lower rail and the upper rail. Hereby, the upper rail supported by the lower rail is moved forward and backward based on a threaded engagement relationship (screw pair) between the screw shaft and the nut member.

SUMMARY OF THE INVENTION

In the meantime, in the seat slide device in which the motor is used as a drive source, restraint in operating noise is an important object. The seat slide device in the above technique also has a problem with operating noise caused when vibrations of the motor are transmitted to the transfer shaft. In this respect, there is room for improvement.

The present invention provides a vehicle seat slide device with a higher silence property.

A seat slide device according to an aspect of the present invention includes: a pair of seat slide rails configured to support a seat, each of the seat slide rails including a lower rail and an upper rail; a transfer shaft rotationally driven by motor drive in a state where the transfer shaft is provided in a bridging manner between the seat slide rails; and rail drive mechanisms, each of the rail drive mechanisms being provided between the lower rail and the upper rail, the transfer shaft having a hollow portion and being configured to move the upper rail relative to the lower rail based on a driving force transmitted from a motor via the transfer shaft.

According to the above aspect, it is possible to restrain an increase in sectional area and to increase a diameter of the transfer shaft. This consequently makes it possible to set a characteristic frequency of the transfer shaft to a higher frequency side than a primary vibration bandwidth of the motor. This makes it possible to restrain amplification of operating noise due to resonance of the transfer shaft, thereby making it possible to secure a higher silence property.

In the above aspect, the hollow portion of the transfer shaft may be provided entirely between both axial end portions of the transfer shaft.

In the above aspect, the transfer shaft may have a circular sectional shape. According to the above configuration, it is possible to maximize a distance from its shaft center to its outer surface. This allows the characteristic frequency of the transfer shaft to efficiently shift to a higher frequency side.

In the above aspect, each of the rail drive mechanisms may include a screw shaft extending in an extension direction of its corresponding seat slide rail, a nut member threadedly engaged with the screw shaft, and a rotation transmission mechanism configured to rotate the screw shaft and the nut member relative to each other based on the driving force transmitted from the motor via the transfer shaft; one of the screw shaft and the nut member may be fixed to one of the lower rail and the upper rail and the other one of the screw shaft and the nut member may be rotationally driven by the rotation transmission mechanism in a state where the other one of the screw shaft and the nut member is supported by the other one of the lower rail and the upper rail; and the axial end portions of the transfer shaft may be formed in a polygonal shaft shape. Further, the axial end portions may be formed in a hexagonal shaft shape.

That is, when the axial end portions serving as connecting portions are formed in an angular shape, it is possible to efficiently transmit its driving torque to the rotation transmission mechanism of each of the rail drive mechanisms. Further, in a case of each of the rail drive mechanisms configured to move the upper rail relative to the lower rail by use of a threaded engagement relationship (screw pair) between the screw shaft and the nut member, it is desired that a position deviation between respective upper rails of the seat slide rails be restrained to be small. According to the above configuration, it is possible to restrain the position deviation between the upper rails of the seat slide rails and to efficiently transmit the driving force of the motor to the rail drive mechanisms via the transfer shaft.

Further, in the above configuration, each of the rail drive mechanisms may be configured such that the screw shaft is non-rotatably supported by the lower rail and the nut member is rotatably supported by the upper rail.

In the above aspect, the transfer shaft may be formed of a steel pipe. According to the above configuration, it is possible to form the transfer shaft by use of a general-purpose material. This makes it possible to achieve cost reduction.

According to the above aspect, it is possible to provide a vehicle seat slide device with a higher silence property.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
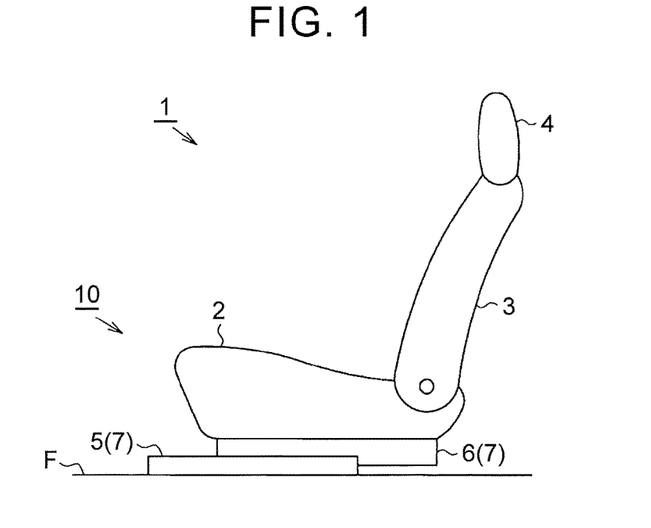
FIG. 1 is a side view illustrating a schematic configuration of a vehicle seat and a seat slide device.

One embodiment of a vehicle seat slide device is described below with reference to the drawings. As illustrated in FIG. 1, a seat 1 for a vehicle includes a seat cushion 2, and a seatback 3 provided in a tilting manner in a rear end of the seat cushion 2. A headrest 4 is provided on an upper end of the seatback 3.

Further, as illustrated in FIGS. 1 to 4, a pair of right and left lower rails 5 extending in a vehicle front-rear direction is provided on a floor F of the vehicle. Further, respective upper rails 6 are attached to the lower rails 5. The upper rail 6 is relatively movable on the lower rail 5 along its extension direction. The seat 1 of the present embodiment is supported by upper parts of seat slide rails 7 each formed by the lower rail 5 and the upper rail 6.

That is, the seat 1 of the present embodiment is fixed to the upper rails 6 in a state where the seat 1 is provided over the seat slide rails 7 on right and left sides. In the present embodiment, a seat slide device 10 is formed such that a front-rear position of the seat 1 supported on the seat slide rails 7 can be adjusted by moving the upper rails 6 relative to the lower rails 5.

Figure 2:
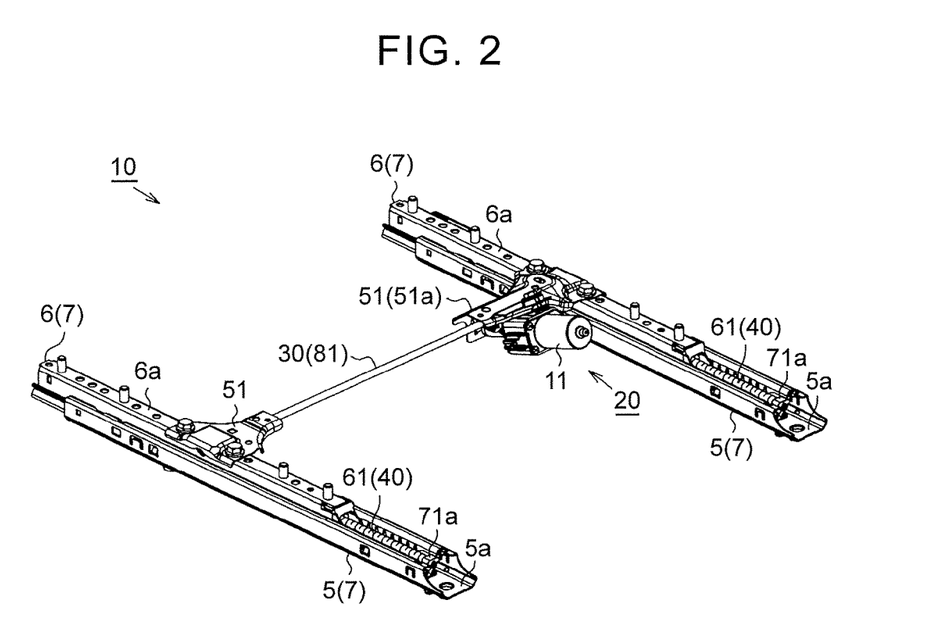
FIG. 2 is a perspective view of the seat slide device.
Figure 3:
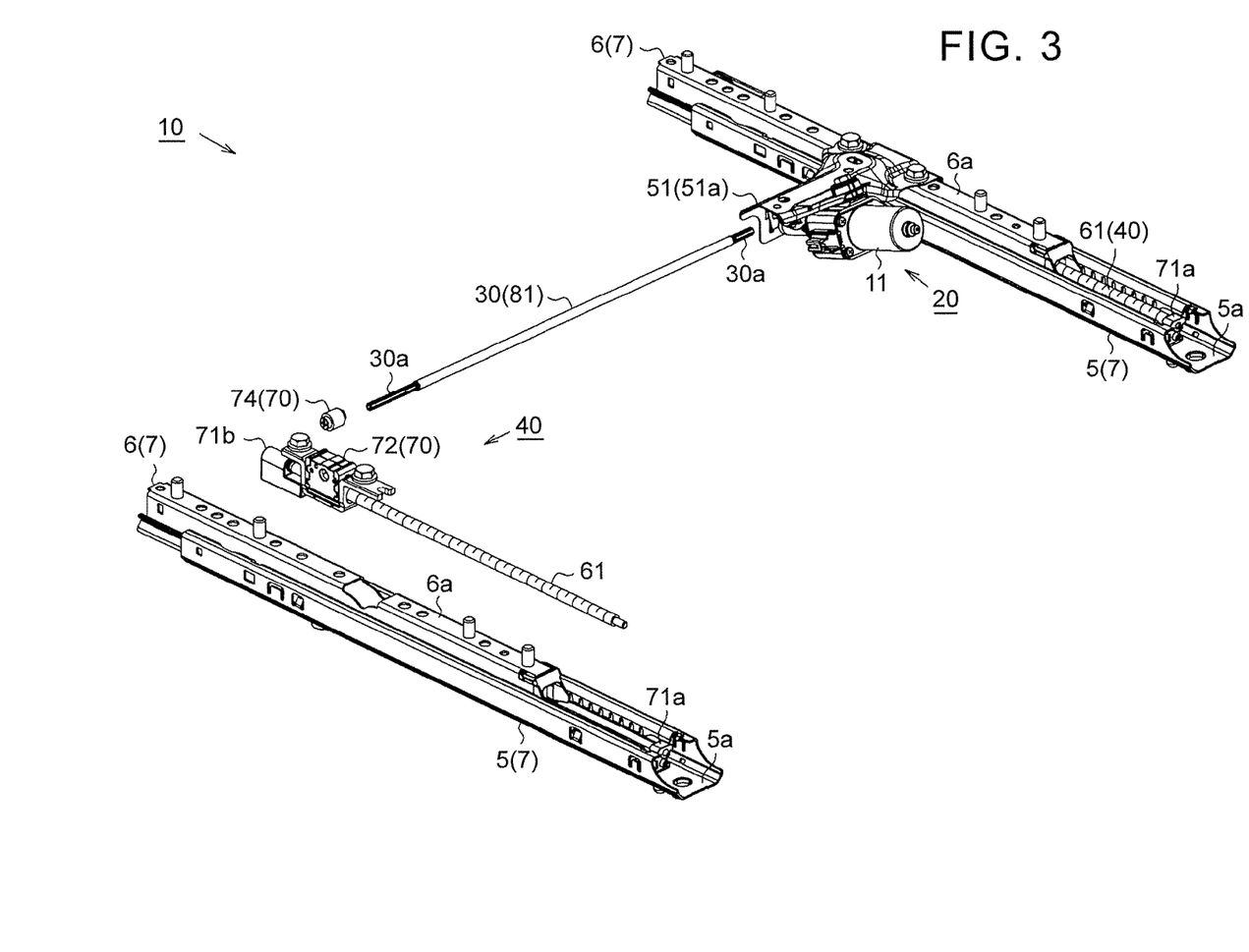
FIG. 3 is an exploded perspective view of the seat slide device.
Figure 4:
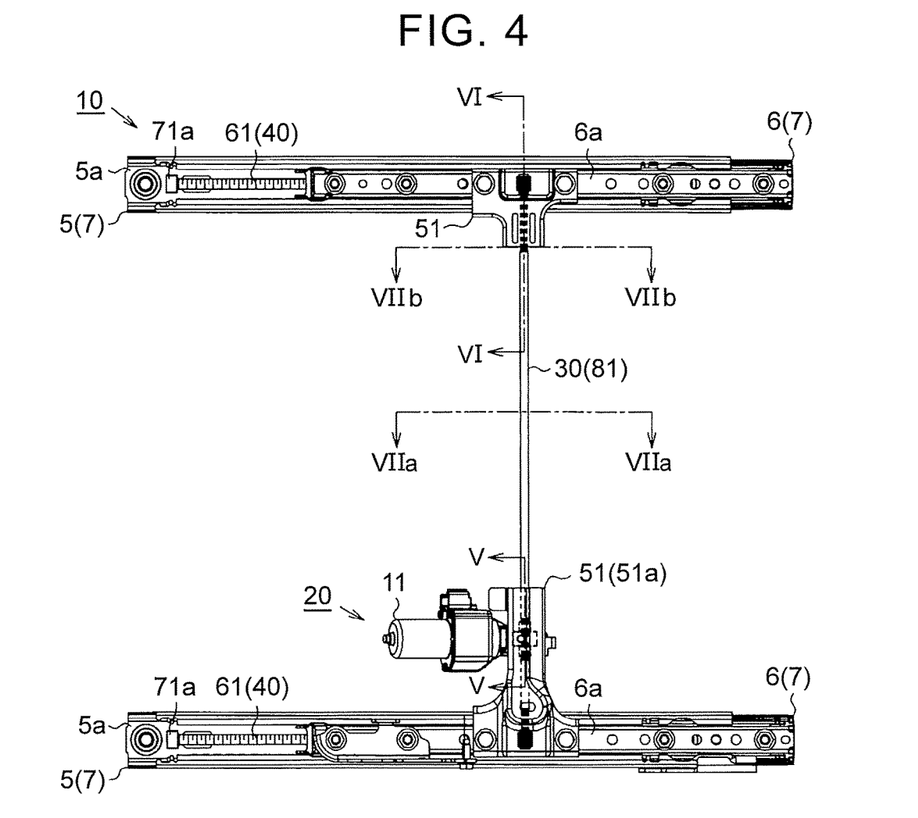
FIG. 4 is a plan view of the seat slide device.

More specifically, as illustrated in FIGS. 2 to 4, the seat slide device 10 of the present embodiment includes an actuator 20 that uses a motor 11 as a drive source. Further, the seat slide device 10 includes a transfer shaft 30 rotationally driven by the actuator 20 in a state where the transfer shaft 30 is provided in a bridging manner between both seat slide rails 7. The seat slide device 10 of the present embodiment includes rail drive mechanisms 40 each provided between the lower rail 5 and the upper rail 6 constituting a corresponding seat slide rail 7 and configured to move the upper rail 6 relative to the lower rail 5 based on a driving force transmitted from the motor 11 via the transfer shaft 30.

More specifically, in the seat slide device 10 of the present embodiment, the upper rails 6 of the seat slide rails 7 are provided with respective brackets 51 fixed to respective upper ends 6a of the upper rails 6 so as to extend inward in a seat-width direction. Note that, in the present embodiment, the brackets 51 are connected to each other via a connection member (not shown) so as to constitute a reinforce bracket as seen in the related art. The actuator 20 of the present embodiment is supported such that the actuator 20 is suspended from one of the brackets 51, more specifically, a bracket 51a provided in the seat slide rail 7 (the upper rail 6 thereof) on a lower side in FIG. 4.

Figure 5:
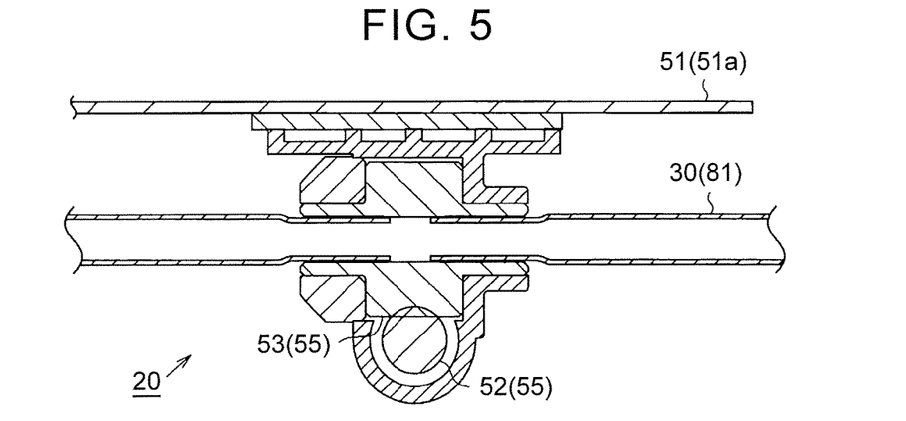
FIG. 5 is a sectional view of the seat slide device (a section taken along a line V-V in FIG. 4, a part corresponding to an actuator)

As illustrated in FIG. 5, the actuator 20 of the present embodiment includes a worm shaft 52 rotating together in an integrated manner with a rotating shaft (not shown) of the motor 11, and a worm wheel 53 engaged with the worm shaft 52. The transfer shaft 30 of the present embodiment is provided so as to penetrate through the worm wheel 53.

That is, the actuator 20 of the present embodiment rotationally drives the transfer shaft 30 provided so as to penetrate through the worm wheel 53, with a well-known worm and wheel mechanism being used as a speed reducer 55. More specifically, as illustrated in FIGS. 2 to 4, in the seat slide device 10 of the present embodiment, the actuator 20 is supported by the bracket 51 (51a) in a state where the motor 11 (a rotating shaft thereof) and an axis of the worm shaft 52 are generally parallel to the seat slide rails 7. Further, the transfer shaft 30 is placed generally orthogonally to the seat slide rails 7. Further, the transfer shaft 30 of the present embodiment is configured such that both axial end portions 30a are inserted into the seat slide rails 7, respectively. Hereby, the seat slide device 10 of the present embodiment is configured such that the driving force of the motor 11 is transmitted to the rail drive mechanism 40 provided between the lower rail 5 and the upper rail 6 constituting each seat slide rail 7.

Figure 6:
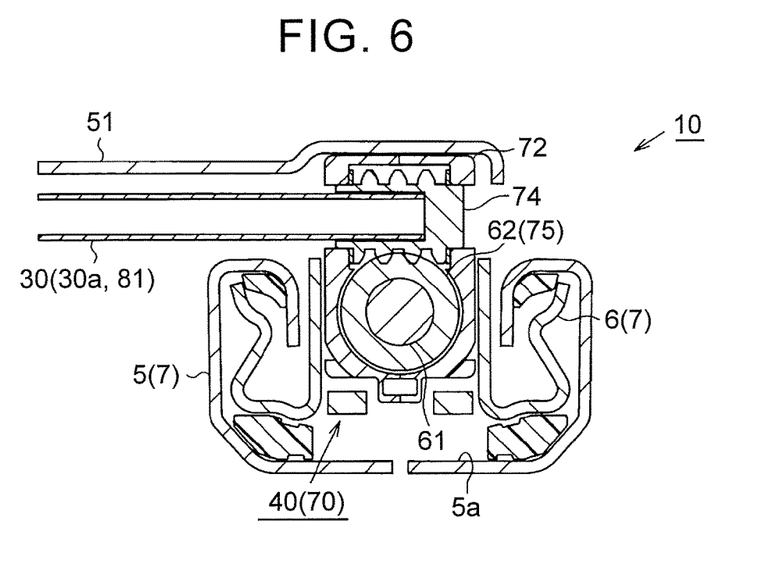
FIG. 6 is a sectional view of the seat slide device (a section taken along a line VI-VI in FIG. 4, a part corresponding to a rail drive mechanism and a rotation transmission mechanism)

More specifically, as illustrated in FIGS. 3 and 6, the rail drive mechanism 40 of the present embodiment includes a screw shaft 61 extending in an extension direction of the seat slide rail 7, a nut member 62 threadedly engaged with the screw shaft, and a rotation transmission mechanism 70 that rotates the screw shaft 61 and the nut member 62 relative to each other based on a driving force transmitted via the transfer shaft 30.

In the rail drive mechanism 40 of the present embodiment, both ends of the screw shaft 61 are supported non-rotatably by a pair of support members 71a, 71b provided in a bottom part 5a of the lower rail 5. The rotation transmission mechanism 70 of the present embodiment includes a holding member 72 fixed to the upper end 6a of the upper rail 6 while rotatably supporting the nut member 62 threadedly engaged with the screw shaft 61.

That is, the rotation transmission mechanism 70 of the present embodiment rotationally drives the nut member 62 supported by the upper rail 6 via the holding member 72, based on the driving force transmitted from the motor 11 via the transfer shaft 30. More specifically, the rotation transmission mechanism 70 of the present embodiment includes a worm gear 74 fixed to the axial end portion 30a of the transfer shaft 30 so as to rotate together in an integrated manner with the transfer shaft 30. Further, a gear portion 75 engaged with the worm gear 74 is formed on an outer peripheral surface of the nut member 62. Hereby, the rail drive mechanism 40 of the present embodiment is configured to move the upper rail 6 relative to the lower rail 5 based on a threaded engagement relationship (screw pair) between the screw shaft 61 and the nut member 62.

Next will be described a feature of the transfer shaft 30 in the seat slide device 10 of the present embodiment, more specifically.

Figure 7A:
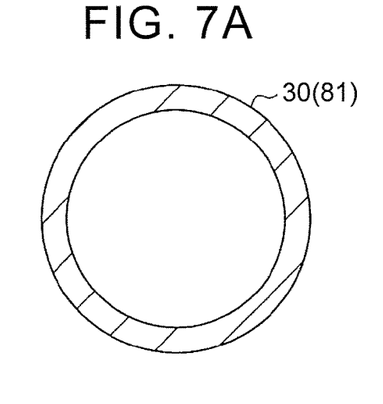
FIG. 7A is a sectional view of a transfer shaft (a section taken along a line VIIa-VIIa in FIG. 4, a central part)

As illustrated in FIG. 7A, the transfer shaft 30 of the present embodiment is configured as a hollow shaft 81 having a hollow portion thereinside. More specifically, the transfer shaft 30 is formed by use of a pipe material made of steel (e.g., SKTM14A), namely, a steel pipe. Hereby, the transfer shaft 30 is configured such that its sectional shape, more specifically, a sectional shape except for the aftermentioned axial end portions 30a (a contour shape of an outer peripheral edge) is circular.

Figure 7B:
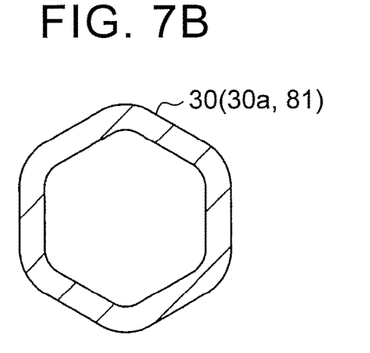
FIG. 7B is a sectional view of the transfer shaft (a section taken along a line VIIb-VIIb in FIG. 4, an axial end portion)

Further, as illustrated in FIG. 7B, the transfer shaft 30 is configured such that the axial end portions 30a are formed in a hexagonal shaft shape. Note that the transfer shaft 30 of the present embodiment is formed as follows: both axial end portions of a steel pipe as a general-purpose material is pressed so that the axial end portions 30a having a hexagonal shaft shape are hollowed. The worm gears 74 of the rotation transmission mechanisms 70 are fitted to the axial end portions 30a, so as to rotate together in an integrated manner with the transfer shaft 30.

Figure 7C:
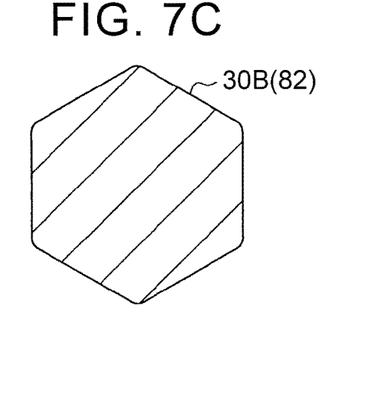
FIG. 7C is a sectional view of a transfer shaft of a related art.
Figure 8A:
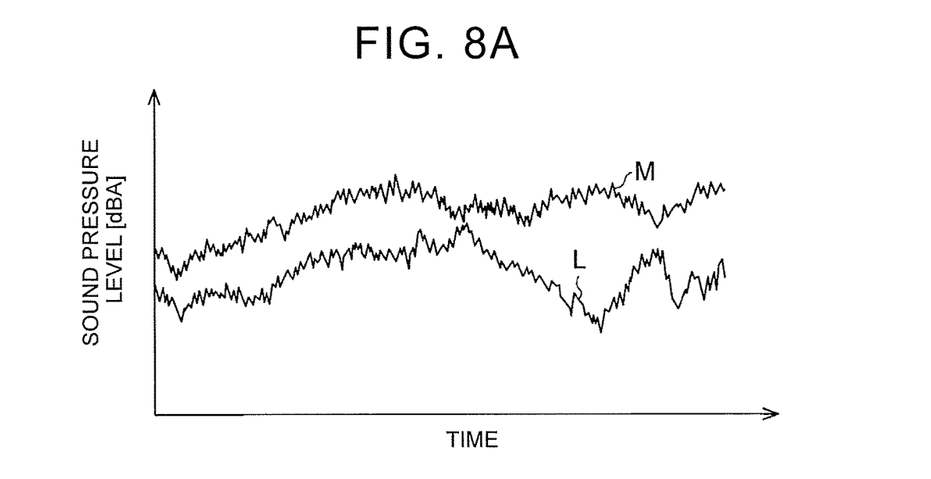
FIG. 8A is a graph (time course) that compares operating noise of the seat slide device.
Figure 8B:
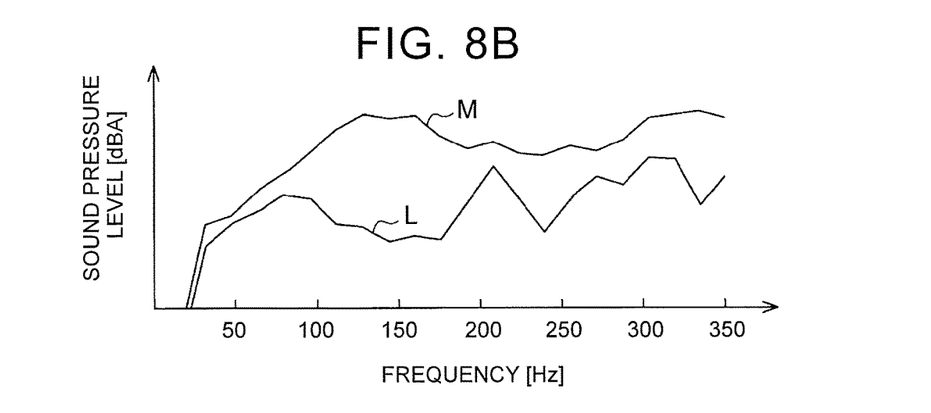
FIG. 8B is a graph (frequency analysis) that compares operating noise of the seat slide device.
Figure 8C:
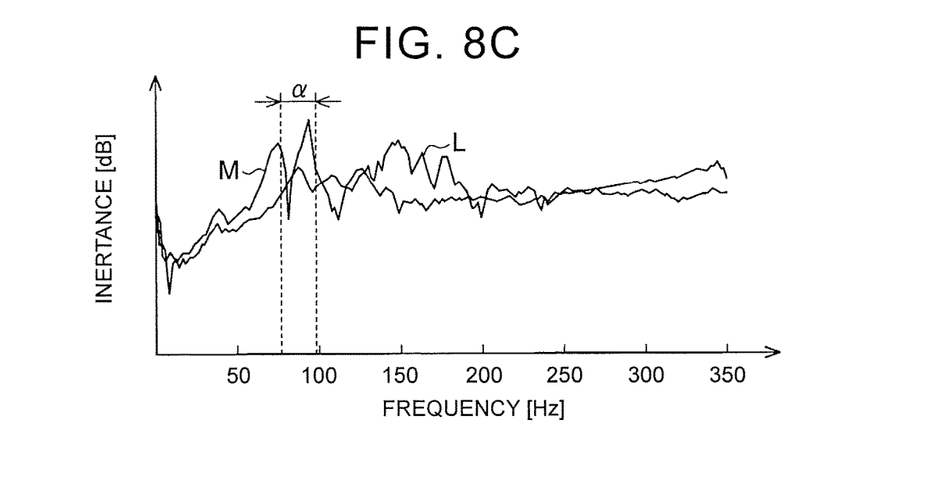
FIG. 8C is a graph illustrating a result of an impact test for the transfer shaft.

Referring now to FIGS. 8A to 8C, the following describes the seat slide device 10 of the present embodiment, more specifically, an operation of the transfer shaft 30 having a hollow. Note that, in each view, a waveform L indicates the seat slide device 10 of the present embodiment. A waveform M indicates a conventional example that uses a solid shaft 82 having a hexagonal shaft shape illustrated in FIG. 7C as a transfer shaft 30B.

As illustrated in FIGS. 8A and 8B, in the seat slide device 10 of the present embodiment that uses the hollow shaft 81 having a circular section as the transfer shaft 30 (see FIG. 7A), its operating noise is restrained to be lower than the conventional example (see FIG. 7C) that uses the solid shaft 82 having a hexagonal shaft shape as the transfer shaft 30B.

More specifically, as illustrated in FIG. 8C, in a case where an impact test (hammering) in which the transfer shaft 30 (30B) is hit by a hammer is performed, the seat slide device 10 of the present embodiment exhibits that a frequency band that easily causes vibration shifts to a higher frequency side than a primary vibration bandwidth α (e.g., about 80 to 100 Hz) of the motor 11. The seat slide device 10 of the present embodiment hereby restrains resonance of the transfer shaft 30, thereby attaining a reduction in the operating noise.

That is, in a case where a material is the same, a characteristic frequency of a shaft body such as the transfer shaft 30 is proportional to a square root ($\sqrt{(I/S)}$) of a value obtained by dividing a geometrical-moment of inertia (I) of the shaft body by a sectional area (S). Note that the "geometrical-moment of inertia" is an amount that indicates difficulty in deformation of an object with respect to a bending moment. As its value is larger, its rigidity in bending is high. The seat slide device 10 of the present embodiment is configured such that its sectional area is restrained and the geometrical-moment of inertia is increased, so that the characteristic frequency of the transfer shaft 30 shifts to a higher frequency side (a right side in FIG. 8C).

More specifically, the geometrical-moment of inertia of the shaft body becomes higher as a distance from a shaft center to an outer surface is larger. However, in a case of a polygonal shaft, a planar portion of its outer periphery is a part where the distance from the shaft center to the outer surface is short. In this regard, when a sectional shape is circular (a contour of an outer peripheral edge is circular), it is possible to maximize the distance from the shaft center to the outer surface. Further, when the shaft body is hollowed, its sectional area can be restrained to be small.

For example, in a comparison with the solid shaft 82 having a hexagonal shaft shape with a minimum shaft diameter (a width across flat) of "5 mm," a geometrical-moment of inertia of the hollow shaft 81 having a diameter of "6.35 mm" and a thickness of "0.7 mm" is about 1.33 times, and a sectional area of the hollow shaft 81 is restrained to 0.46 times. As a result, a value ($\sqrt{(I/S)}$) that determines a characteristic frequency becomes about 1.5 times. Hereby, in the seat slide device 10 of the present embodiment, a characteristic frequency of the transfer shaft 30 is set to a higher frequency side than the primary vibration bandwidth α of the motor 11, thereby restraining amplification of the operating noise caused due to the resonance.

According to the present embodiment, it is possible to yield the following effects. The seat slide device 10 includes a pair of seat slide rails 7 supporting the seat 1 provided thereon, and the transfer shaft 30 rotationally driven by motor drive in a state where the transfer shaft 30 is provided in a bridging manner between the seat slide rails 7. Further, the seat slide device 10 includes the rail drive mechanisms 40, each of the rail drive mechanisms 40 being provided between the lower rail 5 and the upper rail 6 constituting each of the seat slide rails 7 and being configured to move the upper rail 6 relative to the lower rail 5 based on a driving force transmitted from the motor 11 via the transfer shaft 30. In the seat slide device 10, the transfer shaft 30 is configured as the hollow shaft 81.

According to the above configuration, it is possible to restrain an increase in the sectional area and to increase a diameter of the transfer shaft 30. As a result, a characteristic frequency of the transfer shaft 30 can be set to a higher frequency side than the primary vibration bandwidth α of the motor 11. This makes it possible to restrain the amplification of the operating noise due to the resonance of the transfer shaft 30, thereby making it possible to secure a higher silence property. In addition, by increasing its rigidity, it is possible to attain improvement in durability.

The transfer shaft 30 is configured such that its sectional shape (the contour shape of the outer peripheral edge) is circular. This makes it possible to maximize the distance from its shaft center to the outer surface. This allows the characteristic frequency of the transfer shaft 30 to efficiently shift to a higher frequency side.

The transfer shaft 30 is formed of a steel pipe. With such a configuration, it is possible to form the transfer shaft 30 by use of a general-purpose material. This makes it possible to achieve cost reduction.

Each of the rail drive mechanisms 40 includes the screw shaft 61 extending in the extension direction of the seat slide rail 7, and the nut member 62 threadedly engaged with the screw shaft 61. Further, each of the rail drive mechanisms 40 includes the rotation transmission mechanism 70 configured to rotate the screw shaft 61 and the nut member 62 relative to each other based on a driving force transmitted from the motor 11 via the transfer shaft 30, thereby moving the upper rail 6 relative to the lower rail 5 based on a threaded engagement relationship (screw pair) between the screw shaft 61 and the nut member 62. Further, the rotation transmission mechanism 70 includes the worm gear 74 configured to rotate together in an integrated manner with the transfer shaft 30 such that the worm gear 74 is fitted to its corresponding axial end portion 30a of the transfer shaft 30. The transfer shaft 30 is configured such that the axial end portions 30a are formed in a hexagonal shaft shape.

That is, when the axial end portions 30a serving as connecting portions are formed in an angular shape, its driving torque can be efficiently transmitted to the rotation transmission mechanism 70 of each of the rail drive mechanisms 40. Further, in a case of each of the rail drive mechanisms 40 configured to move the upper rail 6 relative to the lower rail 5 by use of a threaded engagement relationship (screw pair) between the screw shaft 61 and the nut member 62, it is desired that a position deviation between the upper rails 6 of the seat slide rails 7 be restrained to be small. According to the above configuration, it is possible to restrain the position deviation between the upper rails 6 of the seat slide rails 7 and to efficiently transmit the driving force of the motor 11 to the rail drive mechanisms 40 via the transfer shaft 30.

Note that the above embodiment can be modified as follows. In the above embodiment, the hollow shaft 81 having a circular section is used as the transfer shaft 30. Alternatively, the sectional shape (the contour shape of the outer peripheral edge) may be a polygonal shape. However, from the viewpoint of increasing the geometrical-moment of inertia, a circular sectional shape is more desirable because it can maximize the distance from the shaft center to the outer surface.

In the above embodiment, the transfer shaft 30 serving as the connecting portions with respect to the rail drive mechanisms 40 (the rotation transmission mechanisms 70 thereof) is configured such that the axial end portions 30*a* are formed in a hexagonal shaft shape. Alternatively, the axial end portions 30*a* of the transfer shaft 30 may be formed in other polygonal shaft shapes than the hexagonal shaft shape. However, in a shaft shape of a square shaft or the like, the number of angles of which is smaller than that of the hexagonal shaft, for example, the position deviation between the upper rails 6 of the seat slide rails 7 tends to easily become larger. In the meantime, in a shaft shape of an octagonal shaft or the like, the number of angles of which is larger than that of the hexagonal shaft, for example, the transfer shaft 30 tends to easily rotate without load.

Further, in the above embodiment, the transfer shaft 30 including the axial end portions 30*a* is formed in a hollow shaft shape (see FIG. 7B). Alternatively, the axial end portions 30*a* serving as the connecting portions may not necessarily be formed in a hollow shape.

In the above embodiment, the transfer shaft 30 is formed by use of a steel pipe made of steel (e.g., SKTM14A), but its material may be changed optionally. Further, its diameter and thickness may be also set optionally.

In the above embodiment, both ends of the screw shaft 61 are non-rotatably supported by the lower rail 5 via the support members 71*a*, 71*b*. Further, the nut member 62 is rotatably supported by the holding member 72 fixed to the upper rail 6. Each of the rail drive mechanisms 40 moves the upper rail 6 relative to the lower rail 5 by use of a threaded engagement relationship (screw pair) between the screw shaft 61 and the nut member 62.

Alternatively, the screw shaft 61 may be supported by the upper rail 6, and the nut member 62 may be supported by the lower rail 5. Further, the screw shaft 61 may be supported rotatably, and the nut member 62 may be supported non-rotatably. Further, each of the rail drive mechanisms 40 may be configured not to use such a threaded engagement relationship between the screw shaft 61 and the nut member 62, and the present invention does not exclude such a configuration.

The following describes a technical idea that can be understood from the above embodiment. A vehicle seat slide device is characterized such that each of the rail drive mechanisms is configured such that the screw shaft is non-rotatably supported by the lower rail and the nut member is rotatably supported by the upper rail.

What is claimed is:

1. A seat slide device comprising:
a pair of seat slide rails configured to support a seat, each of the seat slide rails including a lower rail and an upper rail;
a transfer shaft rotationally driven by motor drive in a state where the transfer shaft is provided in a bridging manner between the seat slide rails, the transfer shaft having a hollow portion entirely between axial end portions of the transfer shaft; and
rail drive mechanisms, each of the rail drive mechanisms being provided between the lower rail and the upper rail and being configured to move the upper rail relative to the lower rail based on a driving force transmitted from a motor via the transfer shaft, wherein
the transfer shaft has a circular sectional shape at the hollow portion and has a polygonal shape at the axial end portions.

2. The seat slide device according to claim 1, wherein:
each of the rail drive mechanisms includes a screw shaft extending in an extension direction of its corresponding seat slide rail, a nut member threadedly engaged with the screw shaft, and a rotation transmission mechanism configured to rotate the screw shaft and the nut member relative to each other based on the driving force transmitted from the motor via the transfer shaft; and
one of the screw shaft and the nut member is fixed to one of the lower rail and the upper rail and the other one of the screw shaft and the nut member is rotationally driven by the rotation transmission mechanism in a state where the other one of the screw shaft and the nut member is supported by the other one of the lower rail and the upper rail.

3. The seat slide device according to claim 2, wherein the axial end portions are formed in a hexagonal shaft shape.

4. The seat slide device according to claim 2, wherein each of the rail drive mechanisms is configured such that the screw shaft is non-rotatably supported by the lower rail and the nut member is rotatably supported by the upper rail.

5. The seat slide device according to claim 1, wherein the transfer shaft is formed of a steel pipe.

6. The seat slide device according to claim 1, wherein the driving force from the motor is transmitted to the transfer shaft at the hollow portion.

* * * * *